United States Patent
Kamasuka et al.

(10) Patent No.: US 8,243,309 B2
(45) Date of Patent: Aug. 14, 2012

(54) IMAGE PROCESSING APPARATUS WHICH CAN AUTOMATICALLY SET AN OPERATION MODE IN ACCORDANCE WITH THE CONTENTS OF A CONNECTED MEMORY AND THE STATE OF THE APPARATUS AND CONTROL METHOD THEREOF

(75) Inventors: Atsushi Kamasuka, Matsudo (JP); Noritsugu Okayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 12/043,921

(22) Filed: Mar. 6, 2008

(65) Prior Publication Data

US 2008/0218795 A1    Sep. 11, 2008

(30) Foreign Application Priority Data

Mar. 9, 2007  (JP) ................. 2007-060904

(51) Int. Cl.
G06K 15/02  (2006.01)
G06K 15/00  (2006.01)
G06F 3/12  (2006.01)
G06F 3/00  (2006.01)
G06F 13/20  (2006.01)
H04N 1/40  (2006.01)

(52) U.S. Cl. .............. 358/1.15; 358/1.11; 358/1.16; 358/444; 710/8; 710/13; 710/313

(58) Field of Classification Search .......... 358/1.14, 358/1.13, 1.15, 1.11, 1.16, 426.12, 462, 426.05, 358/524, 508, 474; 719/319, 327; 710/1, 710/8, 12, 13, 23, 62, 100, 301, 313

See application file for complete search history.

(56) References Cited

U.S. PATENT DOCUMENTS

| | | | |
|---|---|---|---|
| 6,111,659 A | 8/2000 | Murata | |
| 6,330,067 B1 | 12/2001 | Murata | |
| 6,606,161 B2 | 8/2003 | Murata | |
| 6,734,988 B2 | 5/2004 | Murata | |
| 6,750,987 B1 | 6/2004 | Murata | |
| 6,924,902 B2 | 8/2005 | Murata | |
| 6,943,906 B2 | 9/2005 | Murata | |
| 7,054,028 B2 | 5/2006 | Murata | |
| 2003/0184803 A1* | 10/2003 | Yamada et al. | 358/1.16 |
| 2006/0109507 A1 | 5/2006 | Murata | |
| 2006/0181729 A1* | 8/2006 | Kuribara | 358/1.14 |
| 2006/0262356 A1 | 11/2006 | Honda et al. | |
| 2006/0265743 A1 | 11/2006 | Kusunoki et al. | |
| 2006/0279644 A1* | 12/2006 | Toda | 348/231.6 |
| 2007/0247453 A1 | 10/2007 | Shoji et al. | |

FOREIGN PATENT DOCUMENTS

| | | |
|---|---|---|
| JP | 9-093376 | 4/1997 |
| JP | 2002-218134 A | 8/2002 |
| JP | 2004-343236 A | 12/2004 |
| JP | 2006-325028 A | 11/2006 |
| JP | 2007-028179 A | 2/2007 |

* cited by examiner

*Primary Examiner* — Benny Q Tieu
*Assistant Examiner* — Ngon Nguyen
(74) *Attorney, Agent, or Firm* — Fitzpatrick, Cella, Harper & Scinto (57) ABSTRACT

When a storage medium is connected to an MFP, it is determined whether or not the connected storage medium stores data. If it is determined that the storage medium does not store any data for printing, a setting dialog of scanning processing of an original using a scanner is automatically displayed, and the scanning processing of an original is started so as to store the image data corresponding to the original into the storage medium.

12 Claims, 6 Drawing Sheets

IMAGE PROCESSING APPARATUS WHICH CAN AUTOMATICALLY SET AN OPERATION MODE IN ACCORDANCE WITH THE CONTENTS OF A CONNECTED MEMORY AND THE STATE OF THE APPARATUS AND CONTROL METHOD THEREOF

BACKGROUND OF THE INVENTION

1. Field of the Invention

The present invention relates to an image processing apparatus and a control method thereof.

2. Description of the Related Art

In recent years, a USB memory which is connected to the USB bus of a PC and the like and can store data in large quantities is popularly used. A copying machine which comprises a connection unit that can connect such USB memory is also commercially available. Such copying machine can save image data scanned by a scanner in the USB memory, and can read out and print image data stored in it.

Japanese Patent Laid-Open No. 9-93376 describes a technique which stores in advance image data and output information required to print that image data in such removable memory, and reads out and prints the image data according to the output information when the memory is connected to the copying machine.

However, when the user connects the memory to the copying machine, whether he or she wants to print image data held in the memory or to scan an original by the copying machine and to store its image data in the memory cannot be determined at the time of connection. For this reason, when, for example, the user wants to scan an original and to store its image data in the memory, he or she must make an operation for a preparation required to scan the original upon each connection.

SUMMARY OF THE INVENTION

An aspect of the present invention is to eliminate the above-mentioned conventional problems.

Moreover, another aspect of the present invention is to provide an image processing apparatus which can automatically set an operation mode in accordance with the contents of a connected memory, and a control method thereof.

In addition, still another aspect of the present invention is to provide an image processing apparatus which can automatically set an operation mode in accordance with the contents of a connected memory and the state of the apparatus, and a control method thereof.

According to an aspect of the present invention, there is provided an image processing apparatus comprising:

an image reader configured to scan an original to generate image data;

an interface unit configured to connect and disconnect a storage medium and to be accessible to the connected storage medium;

a print unit configured to print an image; and a control unit configured to determine whether or not the storage medium connected to the interface unit stores data, and to control, in a case that it is determined that the storage medium does not store any data for causing the print unit to print, to start scanning processing of an original by the image reader to store the image data corresponding to the original into the storage medium.

According to another aspect of the present invention, there is provided a method of controlling an image processing apparatus comprising the steps of:

scanning an original to generate image data using an image reader;

printing an image;

determining whether or not a connected storage medium stores data; and controlling, in a case that it is determined that the storage medium does not store any data for printing, to start scanning processing of an original to store the image data corresponding to the original into the storage medium.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Numerous embodiments of the present invention will now herein be described below in detail with reference to the accompanying drawings. The following embodiments are not intended to limit the claims of the present invention, and not all combinations of features described in the embodiments are essential to the solving means of the present invention.

Figure 1:
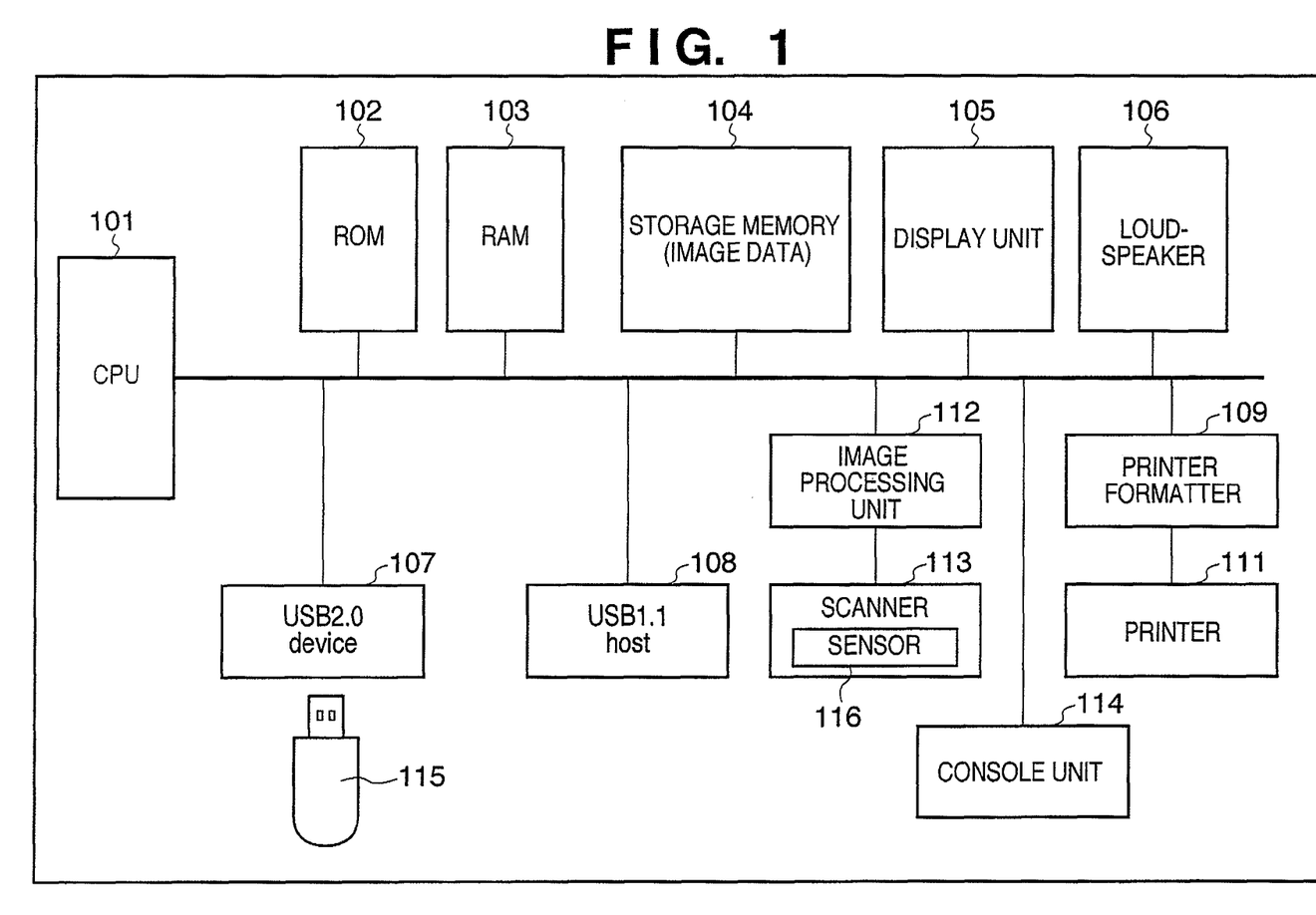
FIG. 1 is a block diagram showing the arrangement of a multifunction peripheral (MFP) according to an exemplary embodiment of the present invention.

FIG. 1 is a block diagram showing the arrangement of a multifunction peripheral (MFP) according to an exemplary embodiment of the present invention. This MFP has a copying function, print function, facsimile function, box function, and the like. The MFP is an example of an image processing apparatus of the present invention, but the image processing apparatus of the present invention is not limited to the MFP.

Referring to FIG. 1, a CPU 101 controls the operation of this MFP as a whole. A ROM 102 stores control programs and various data to be executed by the CPU 101. A RAM 103 comprises, e.g., an SRAM or the like. The RAM 103 provides a work area for saving various data upon execution of the control processing by the CPU 101. The RAM 103 also stores management data, and provides various work buffers, and the like. A storage memory 104 comprises, e.g., a DRAM or the like, and stores image data. A display unit 105 has an LCD and LEDs, and is used to notify the user of messages for them, various statuses, and the like. A loudspeaker 106 is used to audibly notify the user of messages and warnings. A USB interface 107 (USB2.0 device) and USB interface 108 (USB1.1 host) are used to make connections and communications with various USB devices and a PC. These USB interfaces 107 and 108 access to a USB memory connected to them to allow to read out data stored in the USB memory and to store data in that memory (to allow read and write accesses). An image processing unit 112 applies a color conversion process and various image correction processes to image data scanned by a scanner 113. The scanner 113 comprises a CS image sensor, document feeder mechanism, and the like, and optically scans an original to generate electric image data. A sensor 116 is an original detection sensor which detects whether or not an original is readably set on a platen glass. A console unit 114 comprises a keyboard, touch panel, and the like, and is used by the user to make various operation instructions and to input data. A printer formatter 109 interprets file data and converts it into print data upon printing various file data. A printer 111 prints an image on a print sheet according to the print data converted by the printer formatter 109. Reference numeral 115 denotes a USB memory to be connected to the aforementioned USB interface 107 or 108.

Note that the display contents on the display unit 105 may be displayed on the touch panel of the console unit 114. In this case, the display unit may include LEDs.

Figure 2:
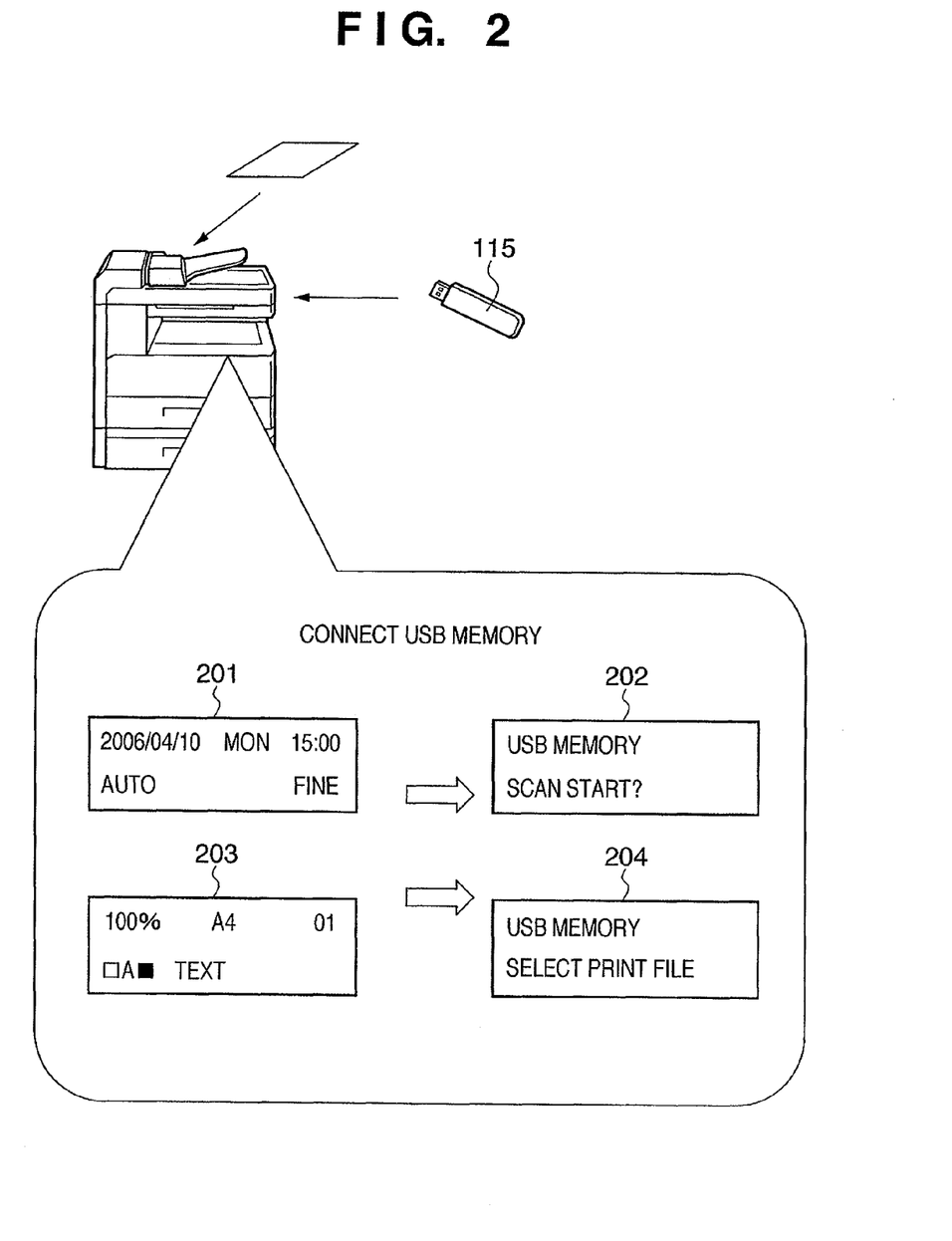
FIG. 2 depicts a view illustrating a display example on a display unit when a USB memory is connected to the MFP according to the embodiment.

FIG. 2 depicts a view illustrating a display example on the display unit 105 when the USB memory is connected to the MFP according to this embodiment.

Referring to FIG. 2, reference numeral 201 denotes a display screen example on the display unit 105 when the MFP stands by in a facsimile mode. Reference numeral 202 denotes an example of a selection dialog on the display unit 105 when the USB memory 115 is connected in the state 201.

Reference numeral 203 denotes a display screen example on the display unit 105 when the MFP stands by in a copy mode for copying an A4 original by scanning it at an equal magnification. Reference numeral 204 denotes an example of a selection dialog on the display unit 105 when the USB memory 115 is connected.

First Embodiment

Figure 3:
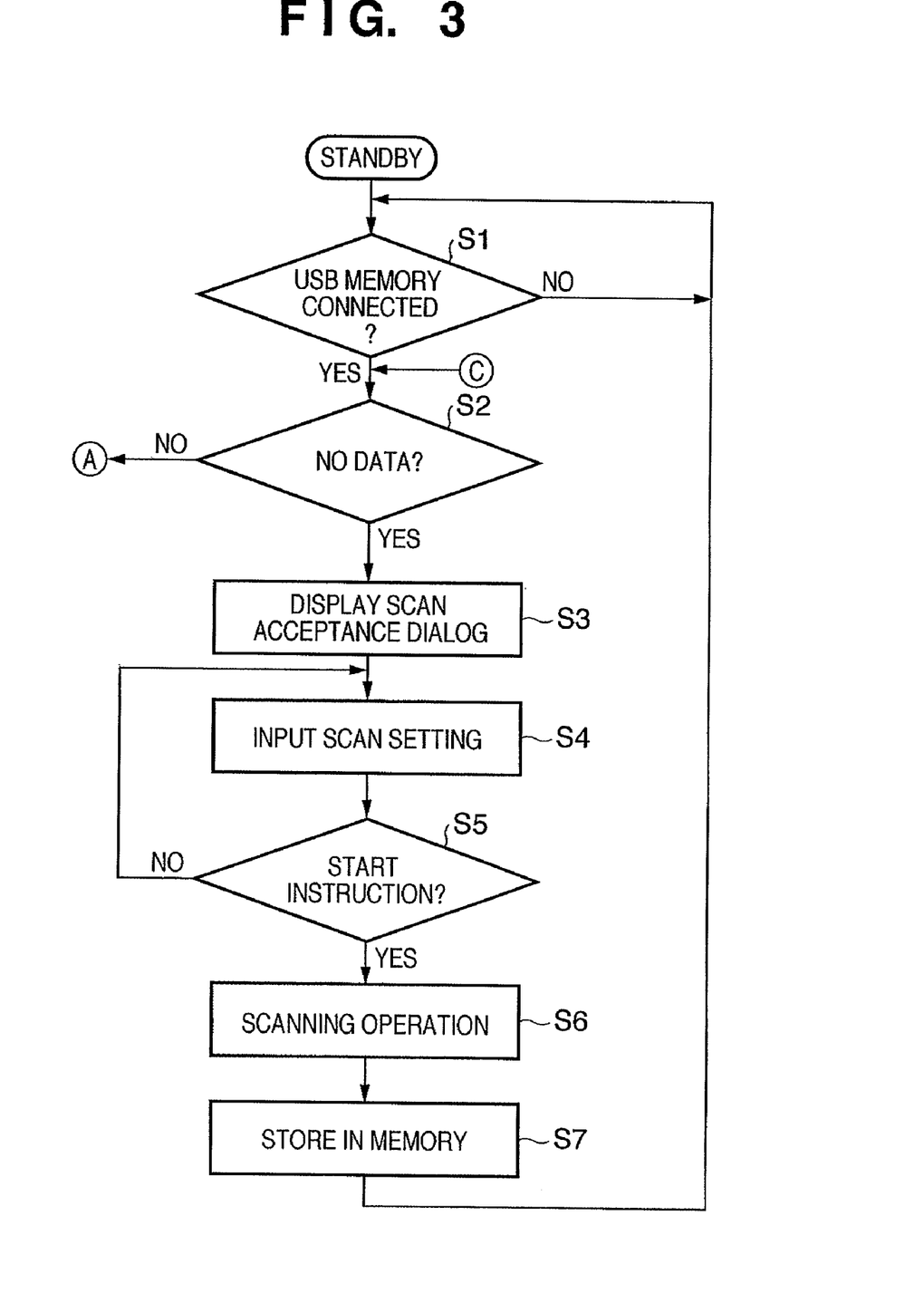
FIG. 3 is a flowchart explaining control processing by the MFP according to the first embodiment of the present invention.

FIG. 3 is a flowchart explaining the control processing by the MFP according to the first embodiment of the present invention. A program which implements this processing is stored in the ROM 102, and is executed under the control of the CPU 101. This processing indicates a case in which when an empty USB memory which does not store any data is connected, original scanning processing using the scanner 113 is automatically started, and image data of the original scanned by the scanner 113 is stored in the connected USB memory 115.

In a standby state after the power switch of the MFP is turned on, if the USB memory 115 is connected to the USB interface 107 or 108, the process advances from step S1 to step S2. The CPU 101 determines in step S2 whether or not the connected USB memory 115 stores arbitrary data. If the memory 115 stores arbitrary data, since the user may want to print that data, the process advances to, e.g., step S12 in FIG. 4. In this case, the process may advance to step S22 in FIG. 5 or step S32 in FIG. 6 in place of step S12 in FIG. 4.

On the other hand, if it is determined in step S2 that the USB memory 115 does not store any data, the process advances to step S3 to display an acceptance dialog of an original scanning instruction using the scanner 113 on the display unit 105. The process then advances to step S4 to receive a user's scan setting instruction input using the console unit 114. This scan setting instruction includes, e.g., the settings of the resolution, density, and the like upon scanning an original. The process advances to step S5 to wait for input of a scan start instruction of the original using the scanner 113. FIG. 2 shows the display example 202 on the display unit 105 at this time. If the user inputs the scan start instruction from the console unit 114, the process advances from step S5 to step S6. In step S6, the scanner 113 scans an original, and the image processing unit 112 applies, to the scanned image data, processing including binarization, a resizing process, encoding, image correction, and the like. The process then advances to step S7 to execute storage control processing for storing digital image data that has undergone the image processing in the USB memory 115 via the corresponding USB interface to which the USB memory 115 is connected. In steps S6 and S7, if an auto document feeder (ADF) is provided in the MFP and a plurality of originals are set in the ADF, then the plurality of originals are read and digital image data is stored in the USB memory 115. This is applicable to steps S17 and S18 in FIG. 4, or steps S26 and S27 in FIG. 5.

As described above, according to the first embodiment, by only connecting the USB memory 115 which does not store any data, the original scanning operation using the scanner 113 can be automatically started.

Second Embodiment

Figure 4:
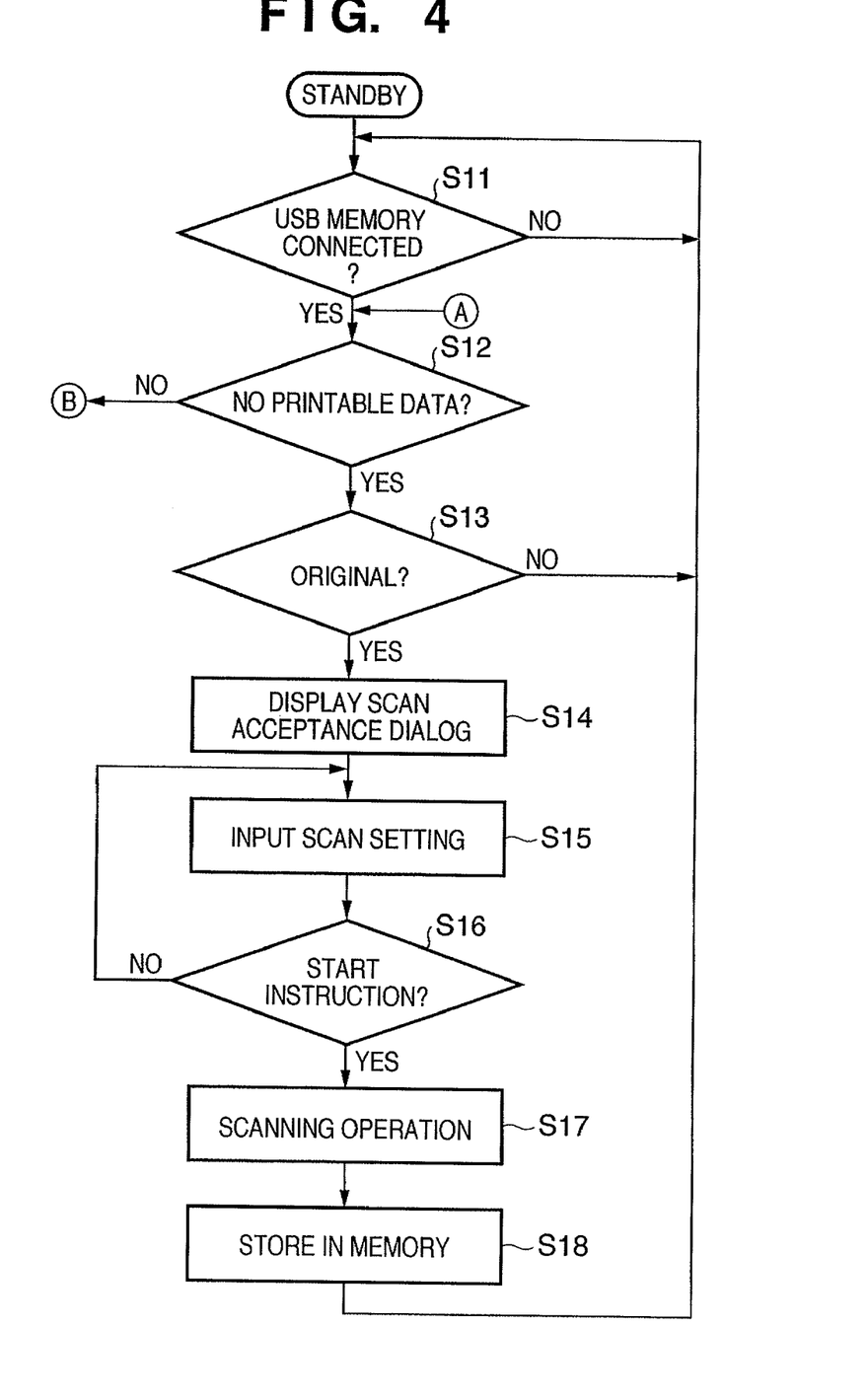
FIG. 4 is a flowchart explaining control processing by the MFP according to the second embodiment of the present invention.

FIG. 4 is a flowchart explaining the control processing by the MFP according to the second embodiment of the present invention. A program which implements this processing is stored in the ROM 102, and is executed under the control of the CPU 101. This processing indicates a case in which when a USB memory which does not store any printable data is connected, and an original is set on the scanner 113, original scanning processing using the scanner 113 is automatically started, and image data scanned by the scanner 113 is stored in the connected USB memory 115. Note that the arrangement of the MFP according to the second embodiment is the same as that of the MFP according to the first embodiment, and a repetitive description thereof will be avoided.

In a standby state after the power switch of the MFP is turned on, if the USB memory 115 is connected to the USB interface 107 or 108, the process advances from step S11 to step S12. The CPU 101 determines in step S12 whether or not the connected USB memory 115 stores printable data. If it is determined in step S12 that the memory 115 stores printable data, since the user may want to print that data, the process advances to, e.g., step S33 in FIG. 6. Note that the printable data indicates image data which have extensions "jpg", "bmp", "gif", and the like, or document data which have extensions "txt", "doc", "xml", "xls", and the like. The same applies to the following embodiments.

On the other hand, if it is determined in step S12 that the USB memory 115 does not store any printable data, the process advances to step S13 to determine based on the state of the original detection sensor 116 of the scanner 113 whether or not an original is set. If no original is set, the CPU 101 determines that no original need be scanned by the scanner 113, and the process returns to step S11. In this case, the CPU 101 may display a message indicating that no original is set on the scanner 113 on the display unit 105, and may wait until the user sets an original on the scanner 113 or the USB memory 115 is exchanged.

If the CPU 101 determines in step S13 that an original is set on the scanner 113, the process advances to step S14 to display an acceptance dialog of an original scanning instruction using the scanner 113 on the display unit 105. The process advances to step S15 to receive a user's scan setting instruction input using the console unit 114. The scan setting instruction includes, e.g., the settings of the resolution, density, and the like upon scanning an original. The process advances to step S16 to wait for an original scan start instruction using the scanner 113. FIG. 2 shows the display example 202 of the display unit 105 at this time. If the user inputs the scan start instruction from the console unit 114, the process advances from step S16 to step S17. In step S17, the scanner 113 scans an original, and the image processing unit 112 applies, to the scanned image data, processing including binarization, a resizing process, encoding, image correction, and the like. Then, the CPU 101 stores the digital image data that has undergone the image processes in the USB memory 115 via the corresponding USB interface to which the USB memory 115 is connected (step S18).

As described above, according to the second embodiment, by only connecting the USB memory 115 which does not store any printable data while an original is set on the scanner, the original scanning operation using the scanner 113 can be automatically started.

Third Embodiment

Figure 5:
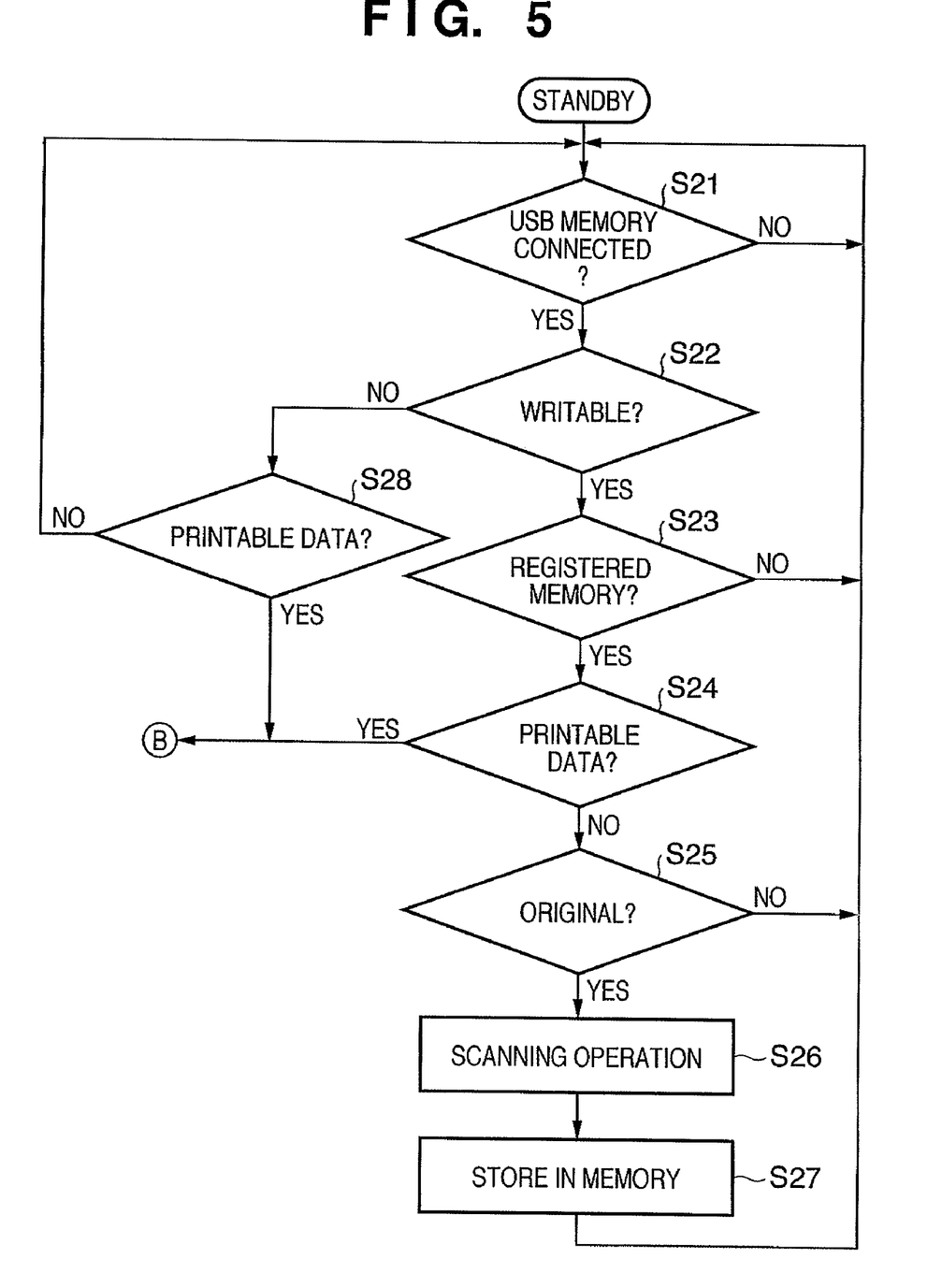
FIG. 5 is a flowchart explaining control processing by the MFP according to the third embodiment of the present invention.

FIG. 5 is a flowchart explaining the control processing by the MFP according to the third embodiment of the present invention. A program which implements this processing is stored in the ROM 102, and is executed under the control of the CPU 101. This processing indicates a case in which when a writable USB memory, which has already registered in this MFP and does not store any printable data, is connected, original scanning processing using the scanner 113 is automatically started, and image data scanned by the scanner 113 is stored in the connected USB memory 115. Note that the arrangement of the MFP according to the third embodiment is the same as that of the MFP according to the first embodiment, and a repetitive description thereof will be avoided.

In a standby state after the power switch of the MFP is turned on, if the USB memory 115 is connected to the USB interface 107 or 108, the process advances from step S21 to step S22. The CPU 101 determines in step S22 whether or not the connected USB memory 115 is writable. If it is determined that the memory 115 is writable, the process advances to step S23 to determines whether or not that USB memory 115 has already registered in this MFP. Whether or not the USB memory has been registered in this MFP is determined by based on whether or not the ID of the USB memory matches the registered IDs of memories stored in the ROM 102 or a nonvolatile storage area of the RAM 103. If it is determined by the CPU 101 in step S23 that the connected USB memory is not registered, the process returns to step S21.

If the CPU 101 determines in step S23 that the memory has already been registered, the process advances to step S24 to determine whether or not the connected USB memory 115 stores print data which is printable by the printer 111. If it is determined in step S24 that the USB memory stores the print data, since the user may want to print that data, the process advances to, e.g., step S33 in FIG. 6.

On the other hand, if it is determined in step S24 that the USB memory 115 does not store any print data in step S24, the process advances to step S25 to determine based on the state of the original detection sensor 116 of the scanner 113 whether or not an original is set. If it is determined in step S25 that no original is set, the CPU 101 determines that no original need be scanned by the scanner 113, and the process returns to step S21. In this case, the CPU 101 may display a message indicating that no original is set on the scanner 113 on the display unit 105, and may wait until the user sets an original on the scanner 113 or the USB memory 115 is exchanged.

If the CPU 101 determines in step S25 that an original is set on the scanner 113, the process advances to step S26 to scan the original using the scanner 113 in accordance with a user's scan setting instruction input using the console unit 114. The image processing unit 112 then applies, to the scanned image data, processing including binarization, a resizing process, encoding, image correction, and the like. Then, the CPU 101 stores the digital image data that has undergone the image processes in the USB memory 115 via the corresponding USB interface to which the USB memory 115 is connected (step S27).

If it is determined in step S22 that the connected USB memory 115 is not writable, the process advances to step S28 to determine whether or not the USB memory 115 stores printable data. If the CPU 101 determines that the USB memory stores printable data, the process advances to step S33 in FIG. 6, thus starting print processing.

As described above, according to the third embodiment, by only connecting the data-writable USB memory 115 which has already been registered in the MFP and does not store any printable data while an original is set on the scanner, the control can automatically start the original scanning operation using the scanner 113.

In the flowchart of FIG. 5, the processes in steps S3 to S5 (steps S14 to S16) in FIGS. 3 and 4 are omitted. However, these processes may be executed between steps S25 and S26 in FIG. 5.

Fourth Embodiment

Figure 6:
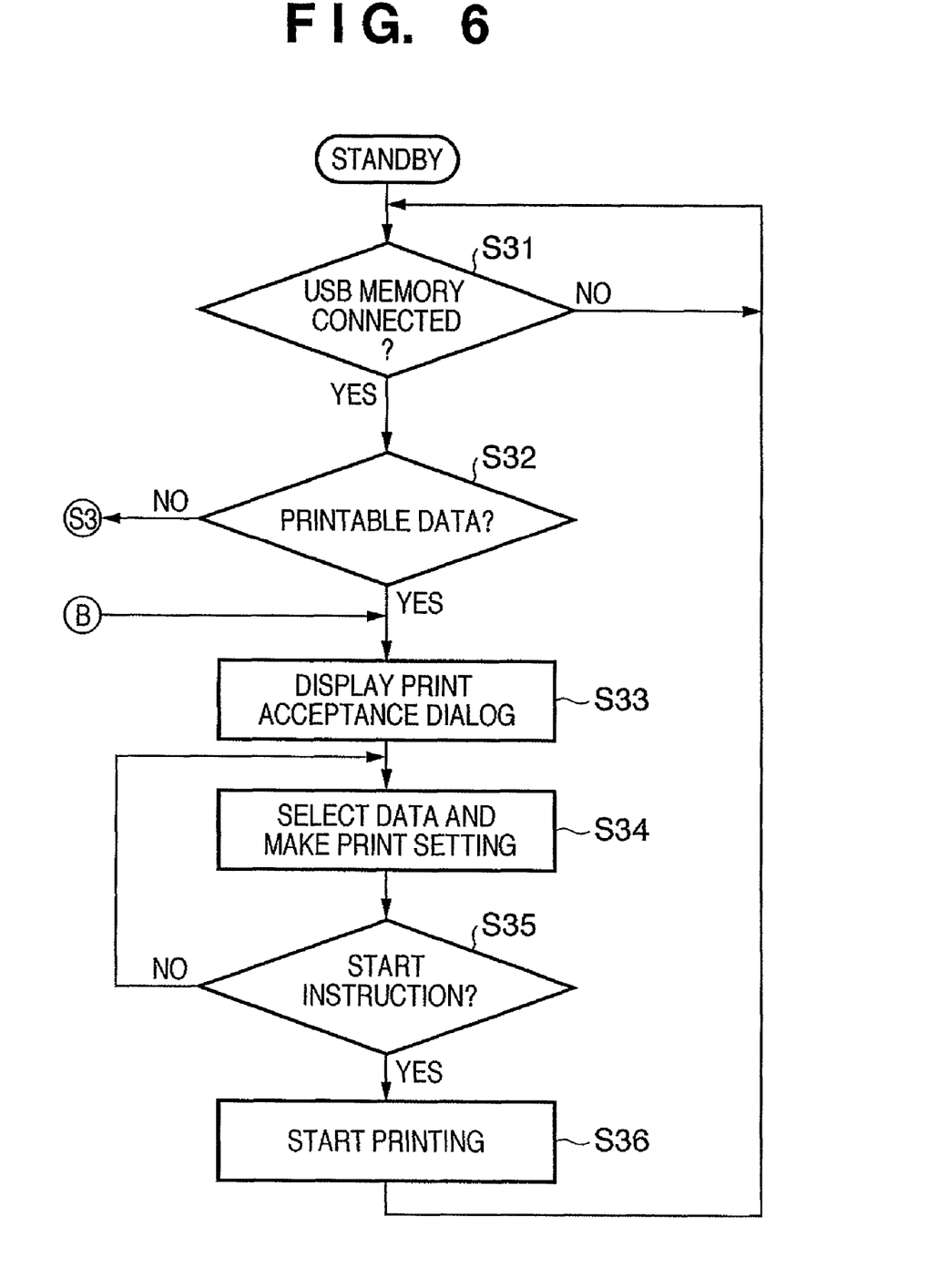
FIG. 6 is a flowchart explaining control processing by the MFP according to the fourth embodiment of the present invention.

FIG. 6 is a flowchart explaining the control processing by the MFP according to the fourth embodiment of the present invention. A program which implements this processing is stored in the ROM 102, and is executed under the control of the CPU 101. This processing indicates a case in which when the connected USB memory 115 stores printable data, the control automatically displays a print dialog that allows the user to select image data to be printed and to make print settings, and prints that data. Note that the arrangement of the MFP according to the fourth embodiment is the same as that of the MFP according to the first embodiment, and a repetitive description thereof will be avoided.

In a standby state after the power switch of the MFP is turned on, if the USB memory 115 is connected to the USB interface 107 or 108, the process advances from step S31 to step S32. The CPU 101 determines in step S32 whether or not the connected USB memory 115 stores printable data. If it is determined in step S32 that the memory 115 does not store any printable data, the process may advance to step S3 in FIG. 3, step S13 in FIG. 4, or step S25 in FIG. 5.

On the other hand, if it is determined in step S32 that the USB memory stores printable data, the process advances to step S33 to display a print acceptance dialog on the display unit 105.

In this case, the CPU 101 displays a selection dialog in a print mode, which prompts the user to select a file to be printed, as denoted by reference numeral 204 in FIG. 2.

The process advances to step S34 to wait until the user makes various settings associated with printing and selects data to be printed using the console unit 114. If the user inputs a print start instruction using the console unit 114 in step S35, the process advances to step S36. In step S36, the printer formatter 109 converts the selected data into print data that the printer 111 can print, thus executing the print processing.

Note that appropriate ones of the first to fourth embodiments may be combined. For example, the determination process in step S13 may be executed before step S3 in FIG. 3.

Furthermore, the processes in steps S22 and S23 in FIG. 5 may be added in addition to step S13.

Before display of the print acceptance dialog in step S33 in FIG. 6, the determination processing for determining whether or not the USB memory has already been registered in step S23 is executed, and if it is determined that the USB memory has already been registered, the process may advance to step S33.

Other Embodiments

The embodiments of the present invention have been described in detail. The present invention can be applied to either a system constituted by a plurality of devices, or an apparatus consisting of a single device.

Note that the present invention can also be achieved by directly or remotely supplying a program of software that implements the functions of the aforementioned embodiments to a system or apparatus, and reading out and executing the supplied program code by a computer of that system or apparatus. In this case, the form of program is not particularly limited as long as it has the program function.

Therefore, the program code itself installed in a computer to implement the functional processing of the present invention using the computer implements the present invention. That is, the claims of the present invention include the computer program itself for implementing the functional processing of the present invention. In this case, the form of program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a home page on the Internet using a browser on a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the present invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted in or connected to the computer. In this case, after the program is written in the memory, a CPU or the like equipped on the function expansion board or unit executes some or all of actual processes based on the instruction of that program, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-60904, filed Mar. 9, 2007, which is hereby incorporated by reference herein in its entirety.

What is claimed is:

1. An image processing apparatus comprising:
   an image reader constructed to scan an original to generate image data;
   an interface unit constructed to connect and disconnect a connected storage medium and to be accessible to the connected storage medium;
   a print unit constructed to print an image; and
   a control unit constructed to determine whether or not the connected storage medium is connected to the interface unit, and to control, in a case that it is determined that a unique identifier of the connected storage medium is identical to a stored unique identifier of a registered storage medium and it is determined that the connected storage medium does not store any data which the print unit can print, to start scanning processing of an original by the image reader to store the image data corresponding to the original into the connected storage medium.

2. The apparatus according to claim 1, wherein in a case that an original is set on the image reader and the image reader is ready to scan, the control unit controls to start the scanning processing of the original by the image reader.

3. The apparatus according to claim 1, wherein in a case that the storage medium connected to the interface unit is writable, the control unit further controls to start the scanning processing of the original by the image reader.

4. The apparatus according to claim 3, wherein the scanning processing of the original displays, on a console unit, a dialog used to set a scan resolution of the image reader, and to input a start instruction of the scanning processing.

5. The apparatus according to claim 1, wherein in a case that it is determined that the storage medium connected to the interface unit stores print data, the control unit controls the print unit to start print processing for printing the print data stored in the storage medium.

6. The apparatus according to claim 5, wherein the print processing displays, on a console unit, a dialog used to select image data to be printed by the print unit and to select a print mode in the print processing.

7. A method of controlling an image processing apparatus including an image reader, an interface for connecting and disconnecting a storage medium and a print unit, the method comprising the steps of:
   determining whether or not a connected storage medium connected to the interface stores data for printing;
   determining whether or not a unique identifier of the connected storage medium is identical to a stored unique identifier of a registered storage medium; and controlling, in a case that it is determined that the connected storage medium does not store any data for printing by the print unit and it is determined that the unique identifier of the connected storage medium is identical to the unique identifier of the registered storage medium, to start scanning processing by the image reader of an original to store the image data corresponding to the original into the connected storage medium.

8. The method according to claim 7, wherein in a case that an original is set on the image reader and the image reader is ready to scan, the scanning processing of the original is started.

9. The method according to claim 7, wherein in a case that the connected storage medium is writable, the scanning processing of the original is started.

10. The method according to claim 7, wherein the scanning processing of the original displays, on a console unit, a dialog used to set a scan resolution of the image reader, and to input a start instruction of the scanning processing.

11. The method according to claim 7, wherein in a case that it is determined that the connected storage medium stores print data, print processing for printing the print data stored in the storage medium is started.

12. The method according to claim 11, wherein the print processing displays, on a console unit, a dialog used to select image data to be printed and to set a print mode in the print processing.

* * * * *